(12) United States Patent
Zhang et al.

(10) Patent No.: US 12,647,944 B2
(45) Date of Patent: Jun. 2, 2026

(54) METHOD AND APPARATUS OF TRANSMITTING DISCOVERY MESSAGE, DEVICE, AND STORAGE MEDIUM

(71) Applicant: GUANGDONG OPPO MOBILE TELECOMMUNICATIONS CORP., LTD., Dongguan (CN)

(72) Inventors: Boyuan Zhang, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 200 days.

(21) Appl. No.: 18/484,782

(22) Filed: Oct. 11, 2023

(65) Prior Publication Data

US 2024/0040547 A1     Feb. 1, 2024

Related U.S. Application Data

(63) Continuation of application No. PCT/CN2021/091749, filed on Apr. 30, 2021.

(51) Int. Cl.
H04W 72/02       (2009.01)
H04W 8/00        (2009.01)
(Continued)

(52) U.S. Cl.
CPC ........... H04W 72/02 (2013.01); H04W 8/005 (2013.01); H04W 48/16 (2013.01); H04W 72/40 (2023.01); H04W 72/25 (2023.01); H04W 92/18 (2013.01)

(58) Field of Classification Search
CPC ..... H04W 72/02; H04W 48/16; H04W 72/40; H04W 92/18; H04W 72/25; H04W 8/005
See application file for complete search history.

(56) References Cited

U.S. PATENT DOCUMENTS

2015/0223141 A1*   8/2015   Chatterjee ........... H04W 40/246
                                                             370/329
2016/0135239 A1*   5/2016   Khoryaev ............. H04W 72/23
                                                             370/329
(Continued)

FOREIGN PATENT DOCUMENTS

CN          106211023 A      12/2016
CN          106454995 A       2/2017
(Continued)

OTHER PUBLICATIONS

OPPO (rapporteur), "Summary of [Post111-3][623][Relay] Remaining issues on relay discovery", Nov. 2020, 3GPP, R2-2010661 (Year: 2020).*

(Continued)

*Primary Examiner* — Michael K Phillips
(74) *Attorney, Agent, or Firm* — Ladas & Parry, LLP

(57) ABSTRACT

Embodiments of the present application provides a discovery message transmission method. A terminal device determines a target resource pool from among multiple available resource pools, wherein the multiple available resource pools are configured as resource pools capable of sending discovery messages; and the terminal device sends a discovery message on the basis of the target resource pool. The embodiments of the present application further provide a discovery message transmission apparatus, a device, and a storage medium.

20 Claims, 5 Drawing Sheets the terminal device determines a target resource pool from multiple available resource pools, and the multiple available resource pools are configured as resource pools capable of sending a discovery message ⟋310 the terminal device sends the discovery message based on the target resource pool ⟋320

(51) Int. Cl.

| | | |
|---|---|---|
| *H04W 48/16* | (2009.01) | |
| *H04W 72/40* | (2023.01) | |
| *H04W 72/25* | (2023.01) | |
| *H04W 92/18* | (2009.01) | |

(56) References Cited

U.S. PATENT DOCUMENTS

| | | | |
|---|---|---|---|
| 2016/0219640 A1 | 7/2016 | Jung et al. | |
| 2017/0034865 A1 | 2/2017 | Jung et al. | |
| 2017/0215059 A1* | 7/2017 | Agiwal | H04W 72/20 |
| 2018/0020339 A1 | 1/2018 | Agiwal et al. | |
| 2018/0132091 A1 | 5/2018 | Adachi | |
| 2018/0139640 A1* | 5/2018 | Chae | H04B 17/318 |
| 2018/0288685 A1 | 10/2018 | Jung et al. | |
| 2019/0261216 A1* | 8/2019 | Lee | H04W 4/40 |
| 2022/0174758 A1* | 6/2022 | Pan | H04W 76/19 |
| 2022/0225072 A1* | 7/2022 | Yang | H04W 72/02 |
| 2022/0322063 A1* | 10/2022 | Kang | H04W 76/14 |
| 2023/0284206 A1* | 9/2023 | Hoang | H04W 72/1263 |
| | | | 370/329 |

FOREIGN PATENT DOCUMENTS

| | | |
|---|---|---|
| CN | 106792890 A | 5/2017 |
| CN | 106793154 A | 5/2017 |
| CN | 107182221 A | 9/2017 |
| CN | 110958691 A | 4/2020 |
| WO | 2017117712 A1 | 7/2017 |
| WO | 2022031921 A1 | 2/2022 |
| WO | 2022/227087 A1 | 11/2022 |

OTHER PUBLICATIONS

Samsung Electronics, "SL relay discovery message", 3GPP TSG-RAN WG2 Meeting #113bis-e, R2-2103085 Online, Apr. 12-Apr. 20, 2021, all pages.

Qualcomm Incorporated, "Discussion on relay discovery model / procedure," 3GPP TSG RAN WG2 Meeting #111-e R2-2006556, E-Conference, Aug. 17-28, 2020, all pages.

CATT, "Discovery Model/Procedure for NR Sidelink Relay," 3GPP TSG-RAN WG2 Meeting #111-e, R2-2006612 Electronic, Aug. 17-28, 2020, all pages.

ZTE Corporation, Sanechips, "Discussion on relay discovery and link management," R2-2006738, 3GPP TSG-RAN WG2 Meeting #111 electronic, Aug. 17-28, 2020, all pages.

Intel Corporation, "On Sidelink Discovery for Relaying," 3GPP TSG RAN WG2 Meeting #111-e R2-2006931 Electronic meeting, Aug. 17-28, 2020, all pages.

LG Electronics Inc., "Consideration of discovery model/procedure for sidelink relay," 3GPP TSG-RAN WG2 Meeting #111e, R2-2008045, Online Meeting, Nov. 17-28, 2020, all pages.

International Search Report, International Application No. PCT/CN2021/091749, mailed Jan. 26, 2022.

Written Opinion of the International Searching Authority in International Application No. PCT/CN2021/091749, mailed Jan. 26, 2022 with translation provided by WIPO.

European Search Report for the corresponding European Application No. 21938560.6, mailed May 8, 2024 (10 pages).

First Office Action of the European application No. 21938560.6, issued on Feb. 25, 2025.

Notice of oral proceedings of the European patent application No. 21938560.6, issued on Oct. 15, 2025.

Notification concerning the date of oral proceedings of the corresponding European patent application No. 21938560.6, issued on Feb. 17, 2026.

* cited by examiner

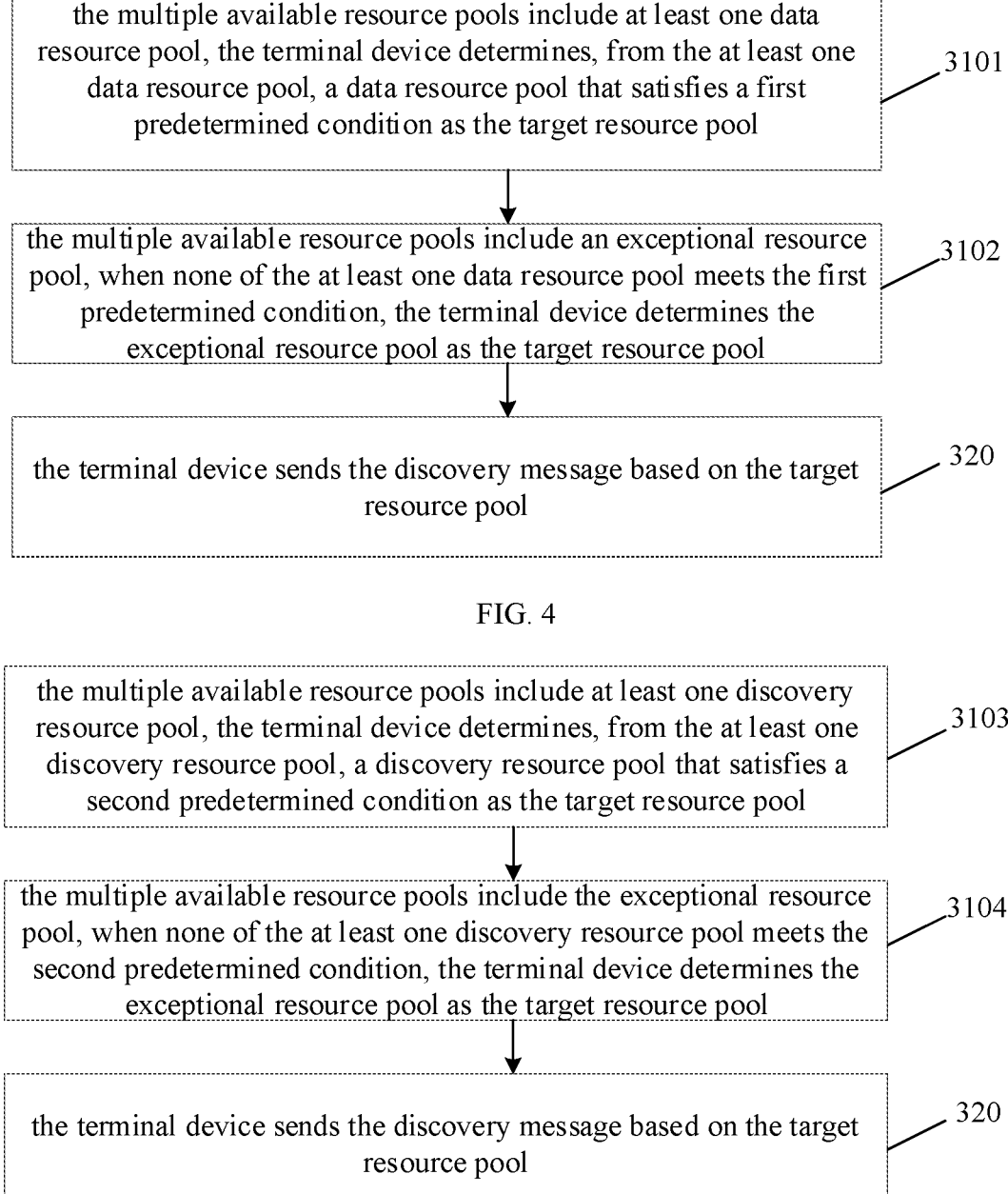

the multiple available resource pools include at least one data resource pool, the terminal device determines, from the at least one data resource pool, a data resource pool that satisfies a first predetermined condition as the target resource pool          3101 the multiple available resource pools include an exceptional resource pool, when none of the at least one data resource pool meets the first predetermined condition, the terminal device determines the exceptional resource pool as the target resource pool          3102 the terminal device sends the discovery message based on the target resource pool          320

FIG. 4 the multiple available resource pools include at least one discovery resource pool, the terminal device determines, from the at least one discovery resource pool, a discovery resource pool that satisfies a second predetermined condition as the target resource pool          3103 the multiple available resource pools include the exceptional resource pool, when none of the at least one discovery resource pool meets the second predetermined condition, the terminal device determines the exceptional resource pool as the target resource pool          3104 the terminal device sends the discovery message based on the target resource pool          320

FIG. 5

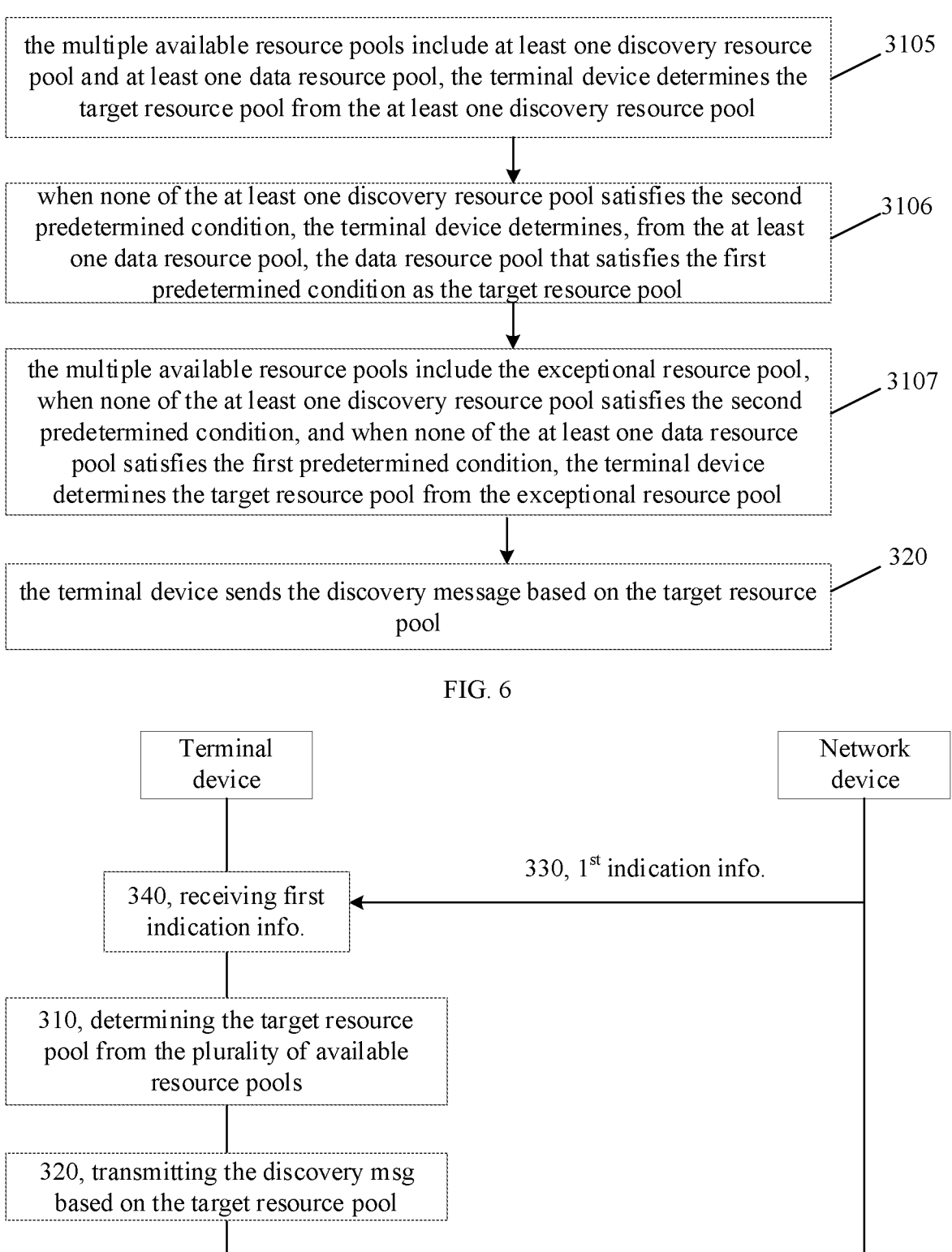

the multiple available resource pools include at least one discovery resource pool and at least one data resource pool, the terminal device determines the target resource pool from the at least one discovery resource pool ⟋3105 when none of the at least one discovery resource pool satisfies the second predetermined condition, the terminal device determines, from the at least one data resource pool, the data resource pool that satisfies the first predetermined condition as the target resource pool ⟋3106 the multiple available resource pools include the exceptional resource pool, when none of the at least one discovery resource pool satisfies the second predetermined condition, and when none of the at least one data resource pool satisfies the first predetermined condition, the terminal device determines the target resource pool from the exceptional resource pool ⟋3107 the terminal device sends the discovery message based on the target resource pool ⟋320

FIG. 6

| Terminal device | | Network device |

330, 1ˢᵗ indication info.

340, receiving first indication info.

310, determining the target resource pool from the plurality of available resource pools 320, transmitting the discovery msg based on the target resource pool

FIG. 7

METHOD AND APPARATUS OF TRANSMITTING DISCOVERY MESSAGE, DEVICE, AND STORAGE MEDIUM

CROSS REFERENCE TO RELATED APPLICATIONS

The present application is a continuation application of the international patent application No. PCT/CN2021/091749, filed on Apr. 30, 2021, and contents of which are incorporated herein by its entireties.

TECHNICAL FIELD

The present disclosure relates to the field of communication, and in particular to a method of transmitting a discovery message, a terminal device, and a network device.

BACKGROUND

Side link (SL) transmission refers to a terminal device directly communicating with another terminal device and has a higher spectral efficiency and a lower transmission latency. The SL transmission process includes a SL discovery process and a SL data communication process. In the SL discovery process, the terminal device may detect discovery messages broadcasted by other terminal devices, such that the terminal device detects, within a short range, presence of other terminal devices that support SL and identifies identity information of other terminal devices. In the SL data communication process, terminal devices may perform, within the short range, various forms of data exchange, such as voice calls or multimedia information sharing.

In practice, a network device may configure different resource pools for the terminal device based on different transmission processes as described above. However, there is no clear method of how the terminal device determine a resource pool from which the discovery message is sent.

SUMMARY OF THE DISCLOSURE

The present disclosure provides a method and apparatus of transmitting a discovery message, a device, and a storage medium.

In a first aspect, a method of transmitting a discovery message is provided and includes:

determining, by a terminal device, a target resource pool from multiple available resource pools, wherein the multiple available resource pools are configured to transmit the discovery message; and transmitting, by the terminal device, the discovery message based on the target resource pool.

In a second aspect, a method of transmitting a discovery message is provided and includes:

transmitting, by a network device, first indication information to a terminal device, wherein the first indication information is configured to indicate that a data resource pool is capable of being configured to transmit a discovery message of direct link, and to indicate that a data resource pool is configured to transmit communication data of the direct link.

In a third aspect, a terminal device is provided and includes a first transceiver, a first processor, and a first memory storing a computer program.

The first transceiver, the first processor, and the first memory are communicated with each other via a first communication bus.

The first processor is configured to communicate with a network device via the first transceiver.

The first processor is further configured to operate, when being run by the computer program stored in the first memory, cooperatively with the first transceiver to perform the operations of the method in the first aspect.

In a fourth aspect, a network device is provided and includes a second transceiver, a second processor, and a second memory storing a computer program.

The second transceiver, the second processor, and the second memory are communicated with each other via a second communication bus.

The second processor is configured to communicate with a terminal device via the second transceiver.

The second processor is further configured to operate, when being run by the computer program stored in the second memory, cooperatively with the second transceiver to perform the operations of the method in the second aspect.

BRIEF DESCRIPTION OF THE DRAWINGS

FIG. 4 is a flow chart II of a method of transmitting a discovery message according to an embodiment of the present disclosure.

FIG. 5 is a flow chart III of a method of transmitting a discovery message according to an embodiment of the present disclosure.

FIG. 6 is a flow chart IV of a method of transmitting a discovery message according to an embodiment of the present disclosure.

FIG. 7 is a flow chart V of a method of transmitting a discovery message according to an embodiment of the present disclosure.

DETAILED DESCRIPTION

In order to make the object, technical solutions and advantages of the present disclosure clearer, the embodiments of the present disclosure are described in detail below by referring to the accompanying drawings. The accompanying drawings are provided for illustrative purposes only and are not intended to limit the present disclosure.

To be noted that the terms "first", "second", and so on, in the specification, claims, and the accompanying drawings of the present disclosure are used to distinguish different objects and are not used to describe a particular order. Furthermore, the terms "include", "have", and any variation thereof, are intended to cover non-exclusive inclusion. For example, a process, a method, a system, a product, or an apparatus including a series of operations or units is not limited to the listed operations or units, but may further include operations or units that are not listed, or includes other operations or units that are inherently included in the process, the method, the system, the product, or the apparatus.

It should be understood that the technical solutions of the present disclosure can be applied to any communication system supporting SL communications, such as: the global system of mobile communication (GSM) system, the code division multiple access (CDMA) system, the wideband code division multiple access (WCDMA) system, the general packet radio service (GPRS), the long term evolution (LTE) system, the advanced long term evolution (LTE-A) system, and the universal mobile telecommunication system (UMTS), the 5th generation (5G) mobile communication system, the new radio (NR) system, and other next generation communication systems.

Figure 1:
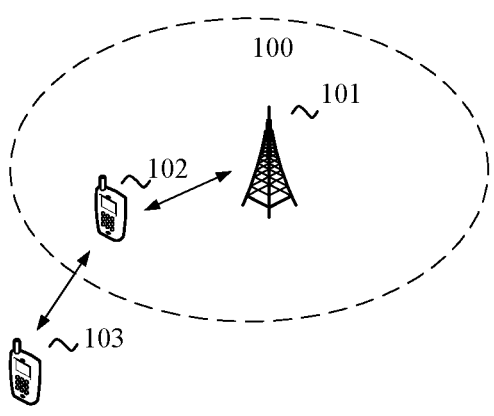
FIG. 1 is a schematic view of an architecture of a wireless communication system according to an embodiment of the present disclosure.

The technical solution of the embodiments of the present disclosure may be applied in the communication system architecture shown in FIG. 1. In FIG. 1, the communication system 100 may include one network device and multiple terminal devices. For example, the communication system 100 may include a network device 101, a terminal device 102, and a terminal device 103.

In embodiments of the present disclosure, the terminal device includes, but is not limited to, a user equipment (UE), a mobile station (MS), a mobile telephone (MT), a handset, portable equipment, and so on. The UE may communicate with one or more core networks via a radio access network (RAN). For example, the UE may be a mobile phone (referred to as a "cellular" phone), a computer having a wireless communication function, and so on. The UE may also be a portable, pocket-sized, hand-held, computer-built or vehicle-mounted mobile device. In addition, the terminal in the embodiments of the present disclosure may also be terminals other than the traditional hand-held terminals, and may include a smart bracelet, a wireless TV, smart glasses, a robot, a watch, and so on.

In the embodiments of the present disclosure, the network device may be a base transceiver station (BTS) in GSM or CDMA, a base station (NodeB) in WCDMA, an evolved Node B (eNB or e-NodeB) in LTE, or an access point having the access function in the 5G communication network. The present disclosure does not limit the network device.

In FIG. 1, the network device may provide wireless access services to the terminal device. Specifically, the network device corresponds to one service coverage region. Any terminal device that enters the region may communicate with the network device via a Uu port to receive the wireless access services provided by the network device.

In addition, one terminal device and another terminal device may perform direct link communication via a PC5 port. One terminal device may communicate with another terminal device via the PC5 port for unicast communication or broadcast communication or multicast communication. Exemplarily, the terminal device 102 and the terminal device 103 in FIG. 1 may perform direct unicast communication with each other via the SL.

The SL discovery process is defined as a process in which a terminal device supporting SL discovery uses direct communication and discovers other terminal devices located near the terminal device via the PC5 port. Exemplarily, as shown in FIG. 1, the terminal device 102 may broadcast a discovery message via the PC5 port, and the terminal device 103 may listen, via the PC5 port, any discovery message sent by other terminal devices in located near the terminal device 103.

In practice, when the terminal devices are located in the service coverage region of the network device, and when the terminal device are not in the service coverage region of the network device, the terminal device always supports the SL discovery process.

In addition, only a terminal device that supports Proximity Service (Prose) public security may perform the SL discovery process when being located out of the service coverage region. For public security SL discovery, a resource pool allowed by the terminal device may be configured in advance, and the terminal device may perform the SL discovery process through the configured resource pool. The resource pool that is configured in advance includes a frequency of a public security carrier.

Figure 2:
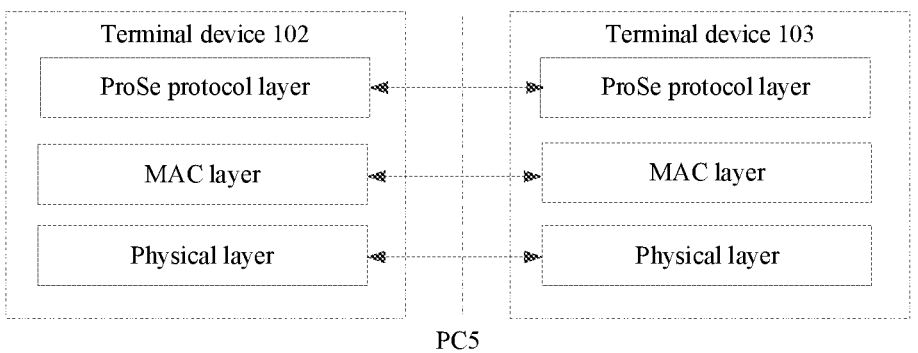
FIG. 2 is a schematic view of a format of a protocol stack of a discovery message according to an embodiment of the present disclosure.

FIG. 2 is a schematic view of a format of a protocol stack of the discovery message. A protocol stack of a discovering signal corresponding to each of the terminal 102 and terminal 103 in FIG. 1 may be included in FIG. 2. The protocol stack of the discovery signal may include a ProSe protocol layer (referred to as an upper layer), a media access control (MAC) layer, and a physical layer (PHY layer). The discovery message of the terminal device is generated by the Prose protocol stack. The ProSe protocol layer may include a ProSe identifier of the terminal device. The terminal devices may identify each other by the ProSe identifiers and communicate directly with each other through the SL.

It should be understood that the terminal device may participate, depending on configuration of the network device, in broadcasting and listening the discovery message in an idle state and in an RRC connected state. The terminal device broadcasts and listens to the discovery message under half-duplex restrictions.

A current universal time coordinated (UTC) time is maintained between the terminal devices involved in broadcasting and listening to the discovery messages. In order to achieve synchronization between the terminal devices, the terminal device that roadcasts the discovery message may send, through a synchronization signal provided in a received system information block 19 (SIB19), a sidelink broadcast control channel (SBCCH) and a synchronization signal to serve as a synchronization source.

In the LTE, the network device configures a separate dedicated resource pool for the discovery message, i.e., a discovery resource pool. The discovery message is transmitted through a resource of the discovery resource pool only. In order to improve an efficiency of sending the discovery message, in a standardization process, the Rel-17 requires that the terminal device may send the discovery message by using a data resource pool in addition to the dedicated discovery resource pool. However, there is no clear method of how the terminal device determines the resource pool for sending the discovery message.

Therefore, the present disclosure provides a method of transmitting the discovery message to solve the technical problems that the method of transmitting the discovery message in the art is not perfect.

Figure 3:
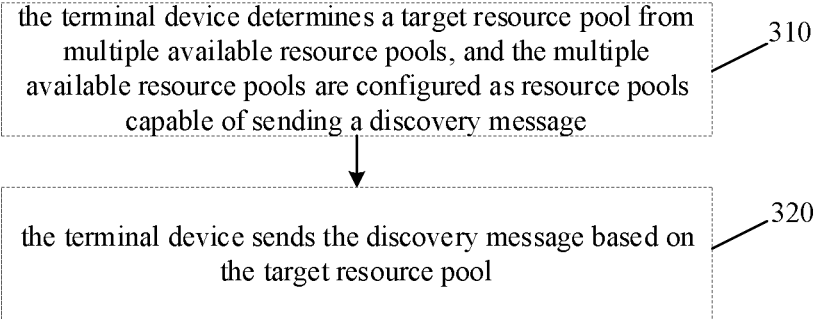
FIG. 3 is a flow chart I of a method of transmitting a discovery message according to an embodiment of the present disclosure.

FIG. 3 is a flow chart I of a method of transmitting the discovery message according to an embodiment of the present disclosure. As shown in FIG. 3, the method of transmitting the discovery message may include operations of 310 and 320.

In an operation 310, the terminal device determines a target resource pool from multiple available resource pools, and the multiple available resource pools are configured as resource pools capable of sending a discovery message.

In an operation 320, the terminal device sends the discovery message based on the target resource pool.

It is understood that the terminal device may be configured with the multiple available resource pools, and the multiple available resource pools are all configured to send the discovery message. When the terminal device desires to initiate SL communication or desires to access a network device via another terminal device, the terminal device may determine one target resource pool from the multiple available resource pools to send the discovery message.

In some embodiments, the multiple available resource pools may be configured by the network device for the terminal device or may be pre-configured by the terminal device. The present disclosure does not limit the configuration of the resource pools. Information of the pre-configured available resource pool may be stored in a storage space of the terminal device or in a universal integrated circuit card (UICC).

In some embodiments, the network device may configure, via configuration information, the multiple available resource pools as described above for the terminal device. The configuration information may be carried by system information or dedicated signaling. The system information may be the system information block 19 (SIB19), and the dedicated signaling may be a radio resource control (RRC) dedicated signaling and is dedicated to carry the signaling of the above configuration information.

To be noted that the multiple available resource pools may include different types of resource pools. That is, the terminal device may use a resource pool that is not dedicatedly configured to send the discovery message to send the discovery message.

In some embodiments, the multiple available resource pools include at least one of the following types of resource pools: a data resource pool, a discovery resource pool, or an exceptional resource pool.

The data resource pool is a resource pool configured to transmit communication data of direct link. The terminal device may be configured with one or more data resource pools.

The data resource pool may include a set of subframes for transmission through the physical sidelink control channel (PSCCH) and/or a set of resource blocks (RB) for transmission through the PSCCH, and a set of subframes for transmission through the physical sidelink shared channel (PSSCH) and/or a set of resource blocks (RB) for transmission through the PSSCH.

To be noted that the data resource pool may send the discovery message as being indicated by the network device. In addition, the data resource pool may be configured to transmit other data in addition to the communication data of direct link and the discovery message of direct link. The present disclosure does not limit the data transmitted by the data resource pool herein.

In addition, the discovery resource pool is a resource pool configured to transmit the discovery message of the direct link. The terminal device may be configured with one or more discovery resource pools. One discovery resource pool may include a set of subframes for discovery transmission and a set of RBs.

To be noted that the discovery resource pool is not limited to transmitting the discovery data of the direct link. The discovery resource pool may further send communication data of the direct link or other data, as being indicated by the network device. The present disclosure does not limit the data transmitted by the discovery resource pool herein.

In the present embodiment, the exceptional resource pool is a resource pool that is temporarily used by the terminal device when the terminal device is having an exceptional event (i.e., an exceptional condition is met). The exceptional event may include switchover, wireless link failure, resource pool updating, and so on. The exceptional resource pool may include a set of subframes and/or a set of RBs.

In some embodiments, the network device may send first configuration information to the terminal device. One or more data resource pools for transmitting the communication data of the direct link may be configured, by the first configuration information, for the terminal device.

In some embodiments, the network device may send second configuration information to the terminal device. One or more resource pools for transmitting the discovery messages of the direct link may be configured, by the second configuration information, for the terminal device.

In some embodiments, the network device may third second configuration information to the terminal device. One or more exceptional resource pools may be configured, by the third configuration information, for the terminal device.

It should be understood that at least one of the first configuration information, the second configuration information, and the third configuration information described in the above may be carried by the system information or by the dedicated signaling.

In some embodiments, the terminal device may determine, based on a congestion parameter of each of the available resource pools, one target resource pool from the above-mentioned multiple available resource pools as the resource pool for sending the discovery message.

In the present embodiment, when the terminal device is configured with the multiple available resource pools capable of sending the discovery message, the terminal device may determine one target resource pool from the multiple available resource pools and send the discovery message via the resource in the target resource pool. In this way, the discovery message may be sent normally, improving the efficiency of resource utilization.

In an embodiment of the present disclosure, the multiple available resource pools may include at least one data resource pool, but does not include the discovery resource pool.

Based on the flow chart shown in FIG. 4, when the multiple available resource pools include the at least one data resource pool and does not include the discovery resource pool, the determining one target resource pool from the multiple available resource pools, in the operation 310, may be achieved by the following operation.

In an operation 3101, the terminal device determines, from the at least one data resource pool, a data resource pool that satisfies a first predetermined condition as the target resource pool. The first predetermined condition is that the congestion parameter of any of the at least one data resource pool is less than a first congestion threshold; and the first congestion threshold is determined based on a priority level of the discovery message corresponding to any of the at least one data resource pool.

It is understood that, in the case that the terminal device is configured with at least one data resource pool only, when the terminal device desires to initiate the SL communication, or when the terminal device accesses the network device through another terminal device, the terminal device may determine, based on a certain selection rule, one data resource pool from the configured at least one data resource pool, as the target resource pool for transmitting the discovery message.

In some embodiments, the terminal device may perform congestion control on the at least one data resource pool one by one and may determine one data resource pool, which satisfies the first predetermined condition, from the at least one data resource pool to serve as the target resource pool.

In detail, the terminal device may obtain the congestion parameter of any of the configured at least one data resource pool, and may compare the obtained congestion parameter of the data resource pool to the first congestion threshold. When the congestion parameter of the data resource pool is less than the above-mentioned first congestion threshold, the terminal device determines that the data resource pool satisfies the first predetermined condition.

In some embodiments, the congestion parameter may be a channel congestion rate, a channel occupancy rate, a channel busy-idle ratio, and other parameters, which are not limited herein. The channel busy-idle ratio is a ratio of the number of sub-channels having received energy within an observation window (S-RSSI) exceeding a certain threshold value to the total number of sub-channels within the observation window.

In some embodiments, the first congestion threshold may be determined by the priority level of the discovery message.

In practice, while the network device configures the data resource pools, the network device configures multiple various congestion thresholds for each of the data resource pools. The various congestion thresholds correspond to various priority levels.

In the present embodiment, when a terminal device is about to send the discovery message, the terminal device may firstly determine a priority level of the instant to-be-sent discovery message. Further, the terminal device may determine a congestion threshold corresponding to the priority level of the discovery message based on the priority level of the discovery message. In this way, the above-mentioned first congestion threshold is obtained.

In some embodiments, the priority level of the discovery message may be configured by the network device. The priority level of the discovery message may be a ProSe per-packet priority (PPPP).

In some embodiments, the network device may carry priority configuration information in the first configuration information for configuring the data resource pool. The network device may configure, by the priority configuration information, the priority level of the discovery message for the terminal device.

In some embodiments, the number of data resource pools, which satisfy the first predetermined condition and are in the at least one data resource pool configured by the terminal device, is more than one. In this case, the terminal device may determine one data resource pool, from the more than one data resource pools satisfying the first predetermined condition, as the target resource pool to transmit the discovery message.

Specifically, the terminal device determines one data resource pool as the target resource pool from the more than one data resource pools that satisfy the first predetermined condition, in at least one of the following manners.

The terminal device determines one data resource pool from the more than one data resource pools that satisfy the first predetermined condition, according to the implementation.

The terminal device determines one data resource pool from the more than one data resource pools that satisfy the first predetermined condition based on an order of values of the congestion parameter corresponding to each of the more than one data resource pools that satisfy the first predetermined condition.

The terminal device determines one data resource pool from the more than one data resource pools that satisfy the first predetermined condition based on geographic location configuration information corresponding to each of the more than one data resource pools that satisfy the first predetermined condition.

In some embodiments, the terminal device determines one data resource pool from the more than one data resource pools that satisfy the first predetermined condition according to the implementation. It is understood that the multiple data resource pools all satisfy the first predetermined condition, and that is, a transmission status of each of the multiple data resource pools is superior. The terminal device may randomly determine one data resource pool as the target resource pool, from the more than one data resource pools that satisfy the first predetermined condition.

In some embodiments, after determining the more than one data resource pools that satisfy the first predetermined condition, the terminal device may place the above-mentioned more than one data resource pools in an order of from a largest congestion parameter value to a lowest congestion parameter value. Based on the order, the terminal device may determine the data resource pool having the smallest congestion parameter value as the target resource pool.

In some embodiments, after determining the more than one data resource pools that satisfy the first predetermined condition, the terminal device may obtain the geographic location configuration information corresponding to each of the more than one data resource pools and determine, based on the geographic location configuration information corresponding to each data resource pool, a better data resource pool as the target resource pool from the more than one data resource pools.

The geographic location configuration information may include information, such as a longitude and a latitude, configured to indicate a geographic location.

In some embodiments, the terminal device may determine one data resource pool from the more than one data resource pools that satisfy the first predetermined condition based on both the order of the values of the congestion parameters of the data resource pools and the geographic location configuration information of each of the data resource pools. Exemplarily, the terminal device may determine the data resource pool, which has the smallest congestion parameter value and is located within a predetermined region, as the target resource pool.

Based on the above embodiment, as shown in FIG. 4, in an embodiment, the multiple available resource pools further include the exceptional resource pool. The operation 310 of determining the target resource pool from the multiple available resource pools may further be achieved by performing the following operations.

In an operation 3102, when none of the at least one data resource pool meets the first predetermined condition, the terminal device determines the exceptional resource pool as the target resource pool.

It is understood that when the terminal device determines that none of the at least one data resource pool satisfies the first predetermined condition, i.e., the congestion parameter of each of the at least one data resource pool is all greater than or equal to the first congestion threshold, the terminal device determines that the transmission status of each of the at least one data resource pool is poor, and the discovery message cannot be transmitted normally. In this case, the terminal device may use the exceptional resource pool to transmit the discovery message.

Therefore, in the method of transmitting the discovery message provided by the present disclosure, in the case that only the data resource pools are configured, the terminal device may determine, based on the congestion parameters of the resource pool, one target resource from the data resource pool or from the exceptional resource pool to transmit the discovery message. In this way, the discovery message may be transmitted normally, increasing the efficiency of resource utilization.

In an embodiment of the present disclosure, the multiple available resource pools may include at least one discovery resource pool and does not include the data resource pool.

As shown in the flow chart in FIG. 5, in the case where the multiple available resource pools include only the at least one discovery resource pool, the determining the target resource pool from the multiple available resource pools in the operation 310 may be achieved by performing the following operations.

In an operation 3103, the terminal device determines, from the at least one discovery resource pool, a discovery resource pool that satisfies a second predetermined condition as the target resource pool.

The second predetermined condition is that a congestion parameter of any of the at least one discovery resource pool is less than a second congestion threshold. The second congestion threshold is determined based on a priority level of the discovery message corresponding to any discovery resource pool.

It is understood that, in the case where the terminal device is configured with only at least one discovery resource pool, when the terminal device desires to initiate SL communication, or when the terminal device accesses the network device through another terminal device, the terminal device may determine, based on a certain selection rule, one discovery resource pool as the target resource pool for transmitting the discovery message, from the configured at least one discovery resource pool.

In some embodiments, the terminal device performs congestion control on the at least one discovery resource pool and determines, from the at least one discovery resource pool, one discovery resource pool that satisfies the second predetermined condition as the target resource pool.

Specifically, the terminal device may obtain a congestion parameter of any of the configured discovery resource pool and may compare the obtained congestion parameter of the discovery resource pool to the second congestion threshold. When the obtained congestion parameter of the discovery resource pool is less than the above-mentioned second congestion threshold, the terminal device determines that the discovery resource pool satisfies the second predetermined condition.

The congestion parameter has been explicitly explained in the above embodiments and will not be repeated herein.

In some embodiments, the second congestion threshold may be determined based on the priority level of the discovery message.

In practice, while the network device configures the discovery resource pool, the network device further configures multiple congestion thresholds for each discovery resource pool. Different congestion thresholds correspond to different data priority levels.

In the present embodiment, when the terminal device desires to transmit the discovery message, the terminal device may firstly determine the priority level of the discovery message that is currently desired to be transmitted. Further, the terminal device may determine a congestion threshold corresponding to the priority level of the discovery message based on the priority level of the discovery message. In this way, the above-mentioned second congestion threshold is obtained.

The priority level of the discovery message has been clearly explained in the above mentioned embodiments and will not be repeated herein.

In some embodiments, the network device may carry priority configuration information in the second configuration information for configuring the discovery resource pool. The network device may configure, by the priority configuration information, the priority level of the discovery message for the terminal device.

In some embodiments, the number of discovery resource pools, which satisfy the second predetermined condition and are included in the at least one discovery resource pool, is more than one. The terminal device may determine, from the more than one discovery resource pools that satisfy the second predetermined condition, one discovery resource pool as the target resource pool for transmitting the discovery message.

Specifically, the terminal device may determine, from the more than one discovery resource pools that satisfy the second predetermined condition, one discovery resource pool as the target resource pool, in at least one of the following manners.

The terminal device determines, based on the implementation, one discovery resource pool from the more than one discovery resource pools that satisfy the second predetermined condition.

The terminal device determines, based on an order of values of the second congestion parameters corresponding to the more than one discovery resource pools that satisfy the second predetermined condition, one discovery resource pool from the more than one discovery resource pools that satisfy the second predetermined condition.

The terminal device determines, based on geographic location configuration information corresponding to each of the more than one discovery resource pools that satisfy the second predetermined condition, one discovery resource pool from the more than one discovery resource pools that satisfy the second predetermined condition.

In some embodiments, the terminal device determines one discovery resource pool from the more than one discovery resource pools that satisfy the second predetermined condition according to the implementation. It is understood that the more than one of discovery resource pools all satisfy the second predetermined condition, and that is, a transmission status of each of the more than one discovery resource pools is superior. The terminal device may randomly determine one discovery resource pool as the target resource pool from the more than one discovery resource pools that satisfy the second predetermined condition.

In some embodiments, after determining the more than one discovery resource pools that satisfy the second predetermined condition, the terminal device may place the more than one discovery resource pools in an order of from a largest congestion parameter value to a lowest congestion parameter value. Based on the order, the terminal device may determine the discovery resource pool having the smallest congestion parameter value as the target resource pool.

In some embodiments, after determining the more than one discovery resource pools that satisfy the second predetermined condition, the terminal device may obtain the geographic location configuration information corresponding to each of the more than one discovery resource pools and determine, based on the geographic location configuration information corresponding to each discovery resource pool, one better discovery resource pool as the target resource pool from the more than one discovery resource pools.

In some embodiments, the terminal device may determine one discovery resource pool from the more than one discovery resource pools that satisfy the second predetermined condition based on both the order of the values of the congestion parameters of the discovery resource pools and the geographic location configuration information of each of the discovery resource pools. Exemplarily, the terminal device may determine the discovery resource pool, which has the smallest congestion parameter value and is located within a predetermined region, as the target resource pool.

Based on the above embodiment, as shown in FIG. 5, in an embodiment of the present disclosure, the multiple available resource pools further include the exceptional resource pool, and the operation 310 of determining the target resource pool from the multiple available resource pools may be achieved further by performing the following operations.

In an operation 3104, when none of the at least one discovery resource pool meets the second predetermined condition, the terminal device determines the exceptional resource pool as the target resource pool.

It is understood that when the terminal device determines that none of the at least one discovery resource pool satisfies the second predetermined condition, i.e., the congestion parameter of each of the at least one discovery resource pool is greater than or equal to the second congestion threshold, the terminal device determines that the transmission status of each of the at least one discovery resource pool is poor, and the discovery message cannot be transmitted normally. In this case, the terminal device may use the exceptional resource pool to transmit the discovery message.

Therefore, in the method of transmitting the discovery message provided by the present disclosure, in the case that only the discovery resource pools are configured, the terminal device may determine, based on the congestion parameters of the resource pool, one target resource from the discovery resource pool or from the exceptional resource pool to transmit the discovery message. In this way, the discovery message may be transmitted normally, increasing the efficiency of resource utilization.

In an embodiment of the present disclosure, the multiple available resource pools may include at least one discovery resource pool and at least one data resource pool.

As shown in the flow chart in FIG. 6, in a case where the multiple available resource pools include at least one discovery resource pool and at least one data resource pool, the determining the target resource pool from the multiple available resource pools in the operation 310 may be achieved by performing the following operations.

In an operation 3105, the terminal device determines the target resource pool from the at least one discovery resource pool.

It is understood that in the case where the terminal device is configured with both at least one discovery resource pool and a first data resource pool, when the terminal device desires to initiate SL communication, or when the terminal device desires to access the network device via another terminal device, the terminal device may firstly determine the discovery resource pool to transmit the discovery message.

In some embodiments, the terminal device determining at least one discovery resource pool as the target resource pool, may be achieved by performing the following.

The terminal device determines, from the at least one discovery resource pool, a discovery resource pool that satisfies the second predetermined condition as the target resource pool.

The second predetermined condition is that the congestion parameter of any of the at least one discovery resource pool is less than the second congestion threshold. The second congestion threshold is determined based on the priority level of the discovery message corresponding to any discovery resource pool.

To be noted that, the method of the terminal device determining, from the at least one discovery resource pool, the discovery resource pool that satisfies the second predetermined condition as the target resource pool, may be the same as the method in the above embodiment, and will not be repeated herein.

In addition, in some embodiments, the number of discovery resource pools, which satisfy the second predetermined condition and are included in the at least one discovery resource pool, is more than one. The terminal device may determine, from the more than one discovery resource pools that satisfy the second predetermined condition, one discovery resource pool as the target resource pool to transmit the discovery message.

Specifically, the terminal device may determine, from the more than one discovery resource pools that satisfy the second predetermined condition, one discovery resource pool as the target resource pool in at least one of following manners.

The terminal device determines, based on the implementation, one discovery resource pool from the more than one discovery resource pools that satisfy the second predetermined condition.

The terminal device determines, based on an order of values of the second congestion parameters corresponding to the more than one discovery resource pools that satisfy the second predetermined condition, one discovery resource pool from the more than one discovery resource pools that satisfy the second predetermined condition.

The terminal device determines, based on geographic location configuration information corresponding to each of the more than one discovery resource pools that satisfy the second predetermined condition, one discovery resource pool from the more than one discovery resource pools that satisfy the second predetermined condition.

In some embodiments, as shown in FIG. 6, the determining the target resource pool from at least one of the data resource pool, the discovery resource pool, and the exceptional resource pool in the operation 310 may be achieved by performing the following operations.

In an operation 3106, when none of the at least one discovery resource pool satisfies the second predetermined condition, the terminal device determines, from the at least one data resource pool, the data resource pool that satisfies the first predetermined condition as the target resource pool.

It is understood that the terminal device firstly determines the discovery resource pool to transmit the discovery message. However, when it is detected that none of the configured at least one discovery resource pool satisfies the second predetermined condition, i.e., the transmission status of each of the configured at least one discovery resource pool is poor, the terminal device may determine, from the configured at least one data resource pool, the data resource pool that satisfies the first predetermined condition to transmit the discovery message.

The first predetermined condition is that the congestion parameter of any of the at least one data resource pool is less than the first congestion threshold. The first congestion threshold is determined based on the priority level of the discovery message corresponding to any data resource pool.

To be noted that, the method of the terminal device determining, from the at least one data resource pool, the data resource pool that satisfies the first predetermined condition as the target resource pool, is the same as the method in the above embodiment, and will not be repeated herein.

In addition, the number of data resource pools, which satisfy the first predetermined condition and are included in the at least one data resource pool, configured for the terminal device is more than one. The terminal device may determine, from the more than one data resource pools that satisfy the first predetermined condition, one data resource pool as the target resource pool to transmit the discovery message.

Specifically, the terminal device determines one data resource pool as the target resource pool from the more than one data resource pools that satisfy the first predetermined condition in at least one of the following manners.

The terminal device determines one data resource pool from the more than one data resource pools that satisfy the first predetermined condition, according to the implementation.

The terminal device determines one data resource pool from the more than one data resource pools that satisfy the first predetermined condition based on an order of values of the congestion parameters corresponding to the more than one data resource pools that satisfy the first predetermined condition.

The terminal device determines one data resource pool from the more than one data resource pools that satisfy the first predetermined condition, based on geographic location configuration information corresponding to each of the more than one data resource pools that satisfy the first predetermined condition.

In some embodiments, the terminal device is further configured with the exceptional resource pool, and as shown in FIG. 6, the determining the target resource pool from the at least one of the data resource pool, the discovery resource pool, and the exceptional resource pool in the operation 310 may be achieved by performing the following operations.

In an operation 3107, when none of the at least one discovery resource pool satisfies the second predetermined condition, and when none of the at least one data resource pool satisfies the first predetermined condition, the terminal device determines the target resource pool from the exceptional resource pool.

It is understood that, when the terminal device determines that none of the configured at least one discovery resource pool satisfies the second predetermined condition, and that none of the configured at least one data resource pool satisfies the first predetermined condition, the transmission status of the configured at least one discovery resource pool and the transmission status of the at least one data resource pool are both poor. Therefore, the discovery message cannot be transmitted normally. In this case, the terminal device may use the exceptional resource pool to transmit the discovery message.

Therefore, in the method of transmitting the discovery message provided by the present disclosure, in the case where only the discovery resource pool is configured, the terminal device may determine, based on the congestion parameters of the resource pools, one target resource to transmit the discovery message, from the discovery resource pool or the exceptional resource pool. In this way, the discovery message may be transmitted normally, improving the efficiency of resource utilization.

In an embodiment, as shown in the flow chart in FIG. 7, before the operation 310 of the terminal device determining the target resource pool from the multiple available resource pools, the terminal device may perform the following operations.

In an operation 330, the network device transmits first indication information to the terminal device. The first indication information is configured to indicate that the data resource pool can be configured to transmit the discovery message of direct link, and indicate that the data resource pool is a resource pool configured to transmit communication data of the direct link.

In an operation 340, the terminal device receives the first indication information. The first indication information is configured to indicate that the data resource pool can be configured to transmit the discovery message of direct link.

In the embodiments of the present disclosure, the network device may indicate whether the data resource pool is capable of transmitting the discovery message of direct link.

The network device may indicate, by the first indication information, to the terminal device that the data resource pool configured for the terminal device can be configured to transmit the discovery message.

It should be understood that the terminal device may receive the indication from the network device before determining the resource pool to transmit the discovery message. After the terminal device receives the first indication information indicating that the data resource pool may be configured to transmit the discovery message of direct link, the terminal device may determine, based on actual configuration of the resource pools, the target resource pool from at least one of the data resource pool, the discovery resource pool, and the exceptional resource pool, to transmit the discovery message.

In some embodiments, the operation 330 of the network device transmitting the first indication information to the terminal device may be achieved in the following manner.

The network device transmits first configuration information to the terminal device. The first configuration information carries the first indication information.

Correspondingly, the operation of the terminal device receiving the first indication information may be achieved in the following manner.

The terminal device receives the first configuration information sent by the network device. The first configuration information carries the first indication information.

The first configuration information is used to configure the data resource pool in the above embodiment. One or more data resource pools may be configured in the first configuration information.

It should be understood that the network device may indicate, by the first configuration information, to the terminal device that the data resource pool is capable of transmitting the discovery message.

The first configuration information is transmitted by the network device to the terminal device for configuring the data resource pool.

In some embodiments, the first configuration information may be carried by the SIB 19 or the RRC dedicated signaling.

In some embodiments, the first configuration information carries the first indication information in at least one of the following ways.

The first configuration information includes a target field. When a value of the target field is a first value, it is indicated that the data resource pool can be used to transmit the discovery message of direct link.

The first configuration information includes resource pool configuration information for at least one data resource pool. When the number of resource pool configuration information is a predetermined number, it is indicated that the data resource pool may be configured to transmit the discovery message of direct link.

The first configuration information includes first power configuration information. The first power configuration information is used to configure a power when the data resource pool is used to transmit the discovery message. The first power configuration information is further configured to indicate that the data resource pool can be configured to transmit the discovery message of direct link.

The first configuration information carries priority configuration information. The priority configuration information is used to configure priority information of the discovery message. The priority configuration information is further configured to indicate that the data resource pool can be configured to transmit the discovery message of direct link.

In some embodiments, the target resource may be a field in a Boolean type and may be identified by "isDiscovery-Allowed", and the above-mentioned first value may be "true".

It is understood that the network device may add an indication field "isDiscoveryAllowed" into the first configuration information of the data resource pool. When the value of the indication field is "true", it is indicated that the data resource pool can be configured to transmit the discovery message. In this way, after the terminal device receives the first configuration information of the data resource pool and reads that the value of the "isDiscoveryAllowed" is "true", the terminal device may determine that the terminal device may use the data resource pool to transmit the discovery message.

In this way, the network device may indicate, by the means of displaying, to the terminal device that the data resource pool is available for transmitting the discovery message.

In some embodiments, the first configuration information may include configuration of one or more data resource pools. The network device may indicate, by setting the number of data resource pools configured in the first configuration information, to the terminal device that the data resource pools may be configured to transmit the discovery message of direct link.

Exemplarily, when the network device carries configuration of only one data resource pool in the first configuration information, it is default that the data resource pool may be configured to transmit the discovery message. When the terminal device receives the first configuration information, the terminal device may use the data resource pool configured in the first configuration information to transmit the discovery message.

In some embodiments, the network device may carry the first power configuration information in the first configuration information.

Specifically, the first power configuration information may be identified by the field "txPowerDisc". The network device may set a value of the field "txPowerDisc" to indicate the power when the terminal device is using the data resource pool to transmit the discovery message. In addition, the network device may implicitly indicate, by the first power configuration information, i.e., the field "txPower-Disc", to the terminal device that the data resource pool may be configured to transmit the discovery message.

Accordingly, after the terminal device receives the first configuration information from the network device, and when the terminal device reads that the first configuration information includes the field "txPowerDisc", the terminal device determines that the data resource pool may be configured to transmit the discovery message. In addition, the terminal device may further read the value of the field "txPowerDisc" and determine the power to transmit the discovery message based on the value of the field.

In some embodiments, the network device may carry the priority configuration information in the first configuration information. Specifically, the priority configuration information may be identified by the field "discPriority". The network device may set a value of the field "discPriority" to indicate the priority level of the discovery message for the terminal device. In addition, the network device may implicitly indicate, by the priority configuration information, i.e. the field "discPriority", to the terminal device that the data resource pool can be configured to transmit the discovery message.

Accordingly, after the terminal device receives the first configuration information sent from the network device, and when the terminal device reads that the first configuration information includes the field "discPriority", the terminal device may determine that the data resource pool can be configured to transmit the discovery message. In addition, the terminal device may further read the value of the field "discPriority" and determine the priority level of the discovery message based on the value of the field.

In the present disclosure, the priority configuration information may be configured to determine the first congestion threshold in the above embodiment. The determination method may be referred to the above embodiment, and will not be repeated here.

In summary, in the method of transmitting the discovery message provided by embodiments of the present disclosure, the network device may indicate, in different ways, to the terminal device that the data resource pool can be configured to transmit the discovery message. In this way, when the terminal device is transmitting the discovery message, the terminal device may determine the resource from the data resource pool to send the discovery message, such that the resource utilization rate is improved.

In some embodiments, the network device may further send second configuration information to the terminal device and may configure, by the second configuration information, the discovery resource pool for the terminal device. Correspondingly, the terminal device receives the second configuration information sent by the network device to determine one or more discovery resource pools configured by the network device.

In some embodiments, the first configuration information may be carried by the SIB 19 or the RRC dedicated signaling.

In some embodiments, the second configuration information further includes second power configuration information. The second power configuration information is used to configure the power when the discovery resource pool is being used to transmit the discovery message.

That is, while the network device is configuring the discovery resource pool, the network device is further configuring to the terminal device the power when the terminal device is using the discovery resource pool to transmit the discovery message. Specifically, the second power configuration information may also be identified by the field "txPowerDisc". The network device may set the value of the field "txPowerDisc" to indicate the power when the terminal device is using the discovery resource pool to transmit the discovery message.

In this way, after receiving the second configuration information, the terminal device may use the discovery resource pool configured in the second configuration information to transmit the discovery message and set a power of transmitting the discovery message to be the configured value.

In some embodiments, the second configuration information further includes period configuration information. The period configuration information is configured to instruct the terminal device to transmit the discovery message according to a preset period.

It should be understood that the terminal device may configure discovery resource pool and a period of transmitting the discovery message at the same time. In this way, after receiving the second configuration information, the terminal device may transmit the discovery message based on the period configuration information.

In some embodiments, the network device may send second indication information to the terminal device and indicate, by the second indication information, that the discovery resource pool can be configured to transmit the communication data of direct link.

Accordingly, the terminal device may receive the second indication information sent from the network device and use, based on the second indication information, the discovery resource pool to transmit the communication data of direct link.

Therefore, in the method provided by the present embodiment, the terminal device may transmit data via the discovery resource pool, improving the resource utilization rate.

In some embodiments, the second indication information may be carried in the second configuration information. That is, while the network device is configuring the discovery resource pool to the terminal device, the network device is indicating to the end device that the configured discovery resource pool may be configured to transmit the communication data of direct link. In this way, signaling overhead is reduced.

In the following, the method of transmitting the discovery message provided by the present disclosure will be described in detail by referring to specific application scenarios.

In an operation 1, the terminal device receives the first indication information sent from the network device.

The first indication information indicates that the data resource pool can be configured to transmit the discovery message.

In some embodiments, the network device may add the target field "isDiscoveryAllowed" into the first configuration information used to configure the data resource pool. The target field is in the Boolean type. The terminal device sets the value of the field to be "true" to indicate that the data resource pool can be configured to transmit the discovery message.

The network device transmits the first configuration information to the terminal device. After the terminal device receives the first configuration information, and when the terminal device reads that the value of the target field is "true", the terminal device uses the data resource pool to transmit the discovery message.

In some embodiments, the network device may carry the configuration of only one data resource pool in the first configuration message used to configure the data resource pool. After the terminal device receives the first configuration information, and when the terminal device detects that the first configuration information carries the configuration of only one data resource pool, the terminal device determines by default that the data resource pool can be used to transmit the discovery message.

In some embodiments, the network device may carry the first power configuration information for the discovery message in the first configuration information used to configure the data resource pool. After the terminal device receives the first configuration information, and when the terminal device detects that the first power configuration information is carried in the first configuration information, the terminal device can use the data resource pool to transmit the discovery message and set the power of transmitting the discovery message to be the value configured in the first power configuration information.

In some embodiments, the network device may carry priority configuration information of the discovery message in the first configuration information used to configure the data resource pool. After the terminal device receives the first configuration information, and when the terminal device detects that the priority configuration information is carried in the first configuration information, the terminal device may use the configured data resource pool to transmit the discovery message.

In an operation 2, when the network device indicates that the data resource pool may be used to transmit the discovery message, the terminal device may determine, from the multiple available resource pools, the target resource pool to transmit the discovery message.

In an implementation, in a case where the available resource pools include only the data resource pool and the data resource pool can be configured to transmit the discovery message, the terminal device may perform congestion control determination on the data resource pool based on the priority level of the discovery message. When the measured channel busy ratio of the data resource pool satisfies the first congestion threshold, the terminal device uses the configured data resource pool to transmit the discovery message.

Further, when the terminal device determines that multiple data resource pools can be configured to transmit the discovery message according to the above method, one data resource pool may be determined based on the implementation of the terminal device.

In some embodiments, when none of the multiple data resource pools has the channel busy ratio meeting the first congestion threshold, the terminal device uses the resource in the exceptional resource pool to transmit the discovery message.

In another implementation, where the available resource pools include only the discovery resource pool, the terminal device may perform the congestion determination on the discovery resource pool based on the priority level of the discovery message. When the channel busy rate of the discovery resource pool measured by the terminal device satisfies the second congestion threshold, the terminal device may use the discovery resource pool to transmit the discovery message.

Further, when the terminal device determines multiple discovery resource pools by performing the above method, the terminal device may determine, based on the implementation, one discovery resource pool to transmit the discovery message.

In some embodiments, when none of the configured multiple discovery resource pools has the channel busy ratio meeting the second congestion threshold, the terminal device uses the exceptional resource pool to transmit the discovery message.

In still another implementation, the available resource pools include the discovery resource pool and the data resource pool scenario, the transmit device may use the discovery resource pool, in priority, to transmit the discovery message.

Specifically, the terminal device may perform congestion control determination on the discovery resource pool based on the priority level of the discovery message. When the measured channel busy rate of the discovery resource pool meets the second congestion threshold, the terminal device uses the configured discovery resource pool to transmit the discovery message.

Further, when the terminal device determines multiple discovery resource pools based on the above method, the terminal device may determine, based on the implementation, one discovery resource pool to transmit the discovery message.

In some embodiments, when none of the discovery resource pools configured by the terminal device meets the second congestion threshold, and when the data resource pool can be configured to transmit the discovery message, the terminal device may perform congestion control determination on the data resource pool based on the priority level of the discovery message. When the measured channel busy ratio of the data resource pool meets the first congestion threshold, the terminal device uses the configured data resource pool to transmit the discovery message.

Otherwise, the terminal device uses the exceptional resource pool to transmit the discovery message.

Therefore, when the terminal device is configured with various types of resource pools, the terminal device may determine one target resource pool from the configured resource pools and may use the resource in the target resource pool to transmit the discovery message.

In this way, the terminal device may select one resource, from the discovery resource pool, the data resource pool, and the exceptional resource pool, to transmit the discovery message, ensuring the discovery message to be transmitted normally, improving the resource utilization.

Figure 8:
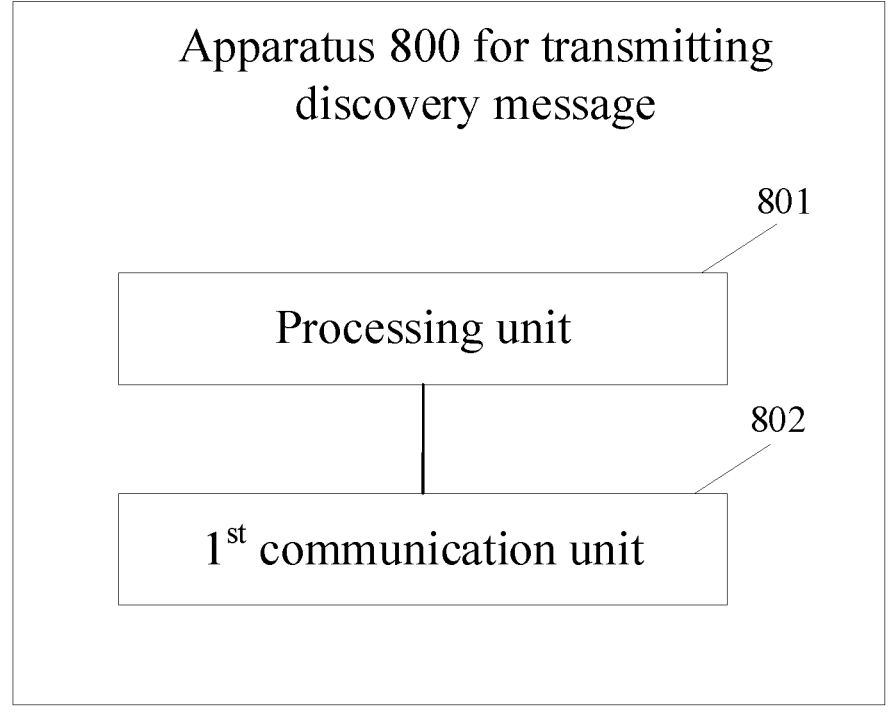
FIG. 8 is a schematic view I of a structure of an apparatus of transmitting a discovery message according to an embodiment of the present disclosure.

The present disclosure provides an apparatus of transmitting the discovery message, and the apparatus may be applied in the terminal device in the above embodiments. As shown in FIG. 8, the apparatus 800 of transmitting the discovery message may include the following.

A processing unit 801 is configured to determine the target resource pool from the multiple available resource pools, and the multiple available resource pools are configured as resource pools capable of transmitting the discovery message.

A first communication unit 802 is configured to transmits the discovery message based on the target resource pool.

In some embodiments, the data resource pool is a resource pool configured to transmit communication data of direct link, the discovery resource pool is a resource pool configured to transmit the discovery message of the direct link, and the exceptional resource pool is a resource pool that is used by the terminal device when the terminal device is in an exceptional state.

In some embodiments, the multiple available resource pools include at least one data resource pool. The processing unit 801 is specifically configured to determine, from the at least one data resource pool, the data resource pool that satisfies the first predetermined condition as the target resource pool. The first predetermined condition is that the congestion parameter of any of the at least one data resource pool is less than the first congestion threshold; and the first congestion threshold is determined based on the priority level of the discovery message corresponding to any of the at least one data resource pool.

In some embodiments, the multiple available resource pools include at least one discovery resource pool. The processing unit 801 is specifically configured to determine, from the at least one discovery resource pool, the discovery resource pool that satisfies the second predetermined condition as the target resource pool. The second predetermined condition is that a congestion parameter of any of the at least one discovery resource pool is less than a second congestion threshold. The second congestion threshold is determined based on a priority level of the discovery message corresponding to any discovery resource pool.

In some embodiments, the multiple available resource pools may include at least one discovery resource pool and at least one data resource pool. The processing unit 801 is specifically configured to determine the target resource pool from the at least one discovery resource pool.

In some embodiments, the processing unit 801 is specifically configured to determine, from the at least one discovery resource pool, a discovery resource pool that satisfies the second predetermined condition as the target resource pool.

In some embodiments, the multiple available resource pools may include the exceptional resource pool. The processing unit 801 is specifically configured to allow, in response to none of the at least one discovery resource pool satisfying the second predetermined condition, the terminal device to determine, from the at least one data resource pool, the data resource pool that satisfies the first predetermined condition as the target resource pool.

In some embodiments, the processing unit 801 is specifically configured to determine the exceptional resource pool as target resource pool under any of the following conditions:

when the multiple available resource pools include at least one data resource pool, and when none of the at least one data resource pool satisfies the first predetermined condition;

when the multiple available resource pools include at least discovery resource pool, and when none of the at least one discovery resource pool satisfies the second predetermined condition; and when the multiple available resource pools include at least discovery resource pool and at least one data resource pool, none of the at least one data resource pool satisfies the first predetermined condition, and none of the at least one discovery resource pool satisfies the second predetermined condition.

In some embodiments, the number of data resource pools, which are included in the at least one data resource pool and satisfy the first predetermined condition, is more than one. The processing unit 801 is configured to determine, from the more than one data resource pools that satisfy the first predetermined condition, one data resource pool as the target resource pool by performing at least one of the following operations.

The processing unit 801 is configured to determine, according to the implementation, one data resource pool from the more than one data resource pools that satisfy the first predetermined condition.

The processing unit 801 is configured to determine, based on the order of values of the congestion parameters corresponding to more than one data resource pools that satisfy the first predetermined condition, one data resource pool from the more than one data resource pools that satisfy the first predetermined condition.

The processing unit 801 is configured to determine, based on the geographic location configuration information corresponding to each of the more than one data resource pools that satisfy the first predetermined condition, one data resource pool from the more than one data resource pools that satisfy the first predetermined condition.

In some embodiments, the number of discovery resource pools, which satisfy the second predetermined condition and are included in the at least one discovery resource pool, is more than one. The processing unit 801 is configured to determine, from the more than one discovery resource pools that satisfy the second predetermined condition, one discovery resource pool as the target resource pool by performing at least one of the following operations.

The processing unit 801 is configured to determine, based on the implementation, one discovery resource pool from the more than one discovery resource pools that satisfy the second predetermined condition.

The processing unit 801 is configured to determine, based on the order of values of the second congestion parameters corresponding to the more than one discovery resource pools that satisfy the second predetermined condition, one discovery resource pool from the more than one discovery resource pools that satisfy the second predetermined condition.

The processing unit 801 is configured to determine, based on geographic location configuration information corresponding to each of the more than one discovery resource pools that satisfy the second predetermined condition, one discovery resource pool from the more than one discovery resource pools that satisfy the second predetermined condition.

In some embodiments, the first communication unit 802 is further configured to receive the first indication information sent from the network device. The first indication information is configured to indicate that the data resource pool can be configured to transmit the discovery message of direct link.

In some embodiments, the first communication unit 802 is specifically configured to receive the first configuration information sent from the network device. The first configuration information is used to configure the data resource pool. The first configuration information carries the first indication information.

In some embodiments, the first configuration information is carried via the system message or the dedicated signaling.

In some embodiments, the first configuration information carries the first indication message in at least one of the following ways.

The first configuration information includes the target field. When the value of the target field is the first value, it is indicated that the data resource pool can be configured to transmit the discovery message of direct link.

The first configuration information includes resource pool configuration information for the at least one data resource pool. When the number of resource pool configuration information is the predetermined number, it is indicated that the data resource pool can be used to transmit the discovery message of direct link.

The first configuration information includes first power configuration information. The first power configuration information is used to configure the power when the data resource pool is being used to transmit the discovery message. The first power configuration information is further configured to indicate that the data resource pool can be used to transmit the discovery message of direct link.

The first configuration information carries priority configuration information. The priority configuration information is used to configure priority information for the discovery message. The priority configuration information is further configured to indicate that the data resource pool can be used to transmit the discovery message of direct link.

In some embodiments, the first communication unit 802 is further configured to receive second configuration information sent from the network device. The second configuration information is used to configure the discovery resource pool.

In some embodiments, the second configuration information is carried via the system message or the dedicated signaling.

In some embodiments, the second configuration information further includes second power configuration information. The second power configuration information is used to configure the power when the discovery resource pool is being used to transmit the discovery message.

In some embodiments, the second configuration information further includes period configuration information. The period configuration information is used to instruct the terminal device to transmit the discovery message at a predetermined period.

In some embodiments, the first communication unit 802 is further configured to receive second indication information sent from the network device. The second indication information indicates that the discovery resource pool can be used to transmit the communication data of direct link.

Figure 9:
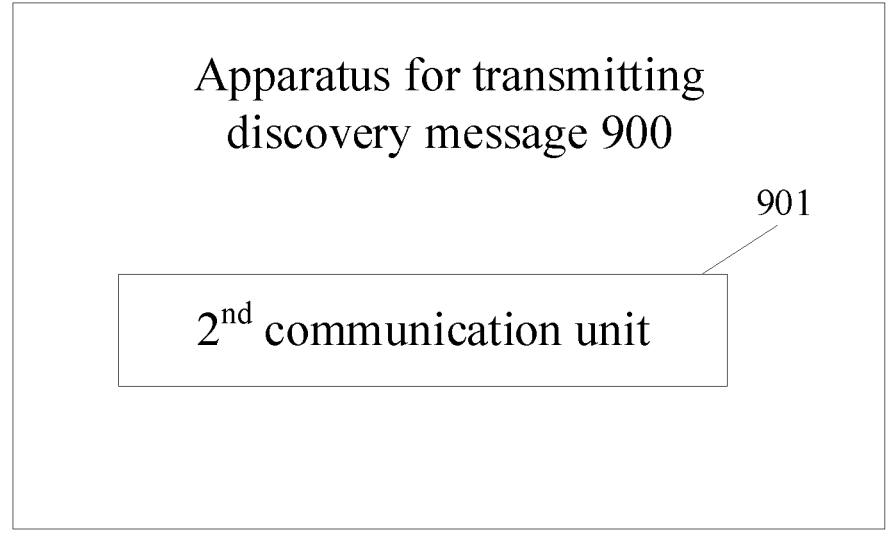
FIG. 9 is a schematic view II of a structure of an apparatus of transmitting a discovery message according to an embodiment of the present disclosure.

The present disclosure further provides an apparatus for transmitting the discovery message applied in the network device provided in the above embodiment. As shown in FIG. 9, the apparatus 900 for transmitting the discovery message may include the following.

A second communication unit 901 is configured to transmit the first indication information to the terminal device. The first indication information is configured to indicate that the data resource pool can be configured to transmit the discovery message of direct link, and indicate that the data resource pool is a resource pool configured to transmit communication data of the direct link.

In some embodiments, the second communication unit 901 is configured to transmit the first configuration information to the terminal device. The first configuration information is used to configure the data resource pool and carries the first indication information.

In some embodiments, the first configuration information may be carried by the system information or the dedicated signaling.

In some embodiments, the first configuration information carries the first indication information in at least one of the following manners.

The first configuration information includes the target field. When the value of the target field is a first value, it is indicated that the data resource pool can be used to transmit the discovery message of direct link.

The first configuration information includes resource pool configuration information for at least one data resource pool. When the number of resource pool configuration information is a predetermined number, it is indicated that the data resource pool may be configured to transmit the discovery message of direct link.

The first configuration information includes first power configuration information. The first power configuration information is used to configure a power when the data resource pool is used to transmit the discovery message. The first power configuration information is further configured to indicate that the data resource pool can be used to transmit the discovery message of direct link.

The first configuration information carries priority configuration information. The priority configuration information is used to configure priority information of the discovery message. The priority configuration information is further configured to indicate that the data resource pool can be configured to transmit the discovery message of direct link.

In some embodiments, the second communication unit 901 is specifically configured to transmit the second configuration information to the terminal device, and the second configuration information is used to configure the discovery resource pool. The discovery resource pool is the resource pool used to transmit the discovery message of direct link.

In some embodiments, the first configuration information may be carried by the system information or the dedicated signaling.

In some embodiments, the second configuration information further includes second power configuration information. The second power configuration information is used to configure the power when the discovery resource pool is being used to transmit the discovery message.

In some embodiments, the second configuration information further includes period configuration information. The period configuration information is configured to instruct the terminal device to transmit the discovery message according to a preset period.

In some embodiments, the second communication unit 901 is specifically configured to send second indication information to the terminal device, and the second indication information indicates that the discovery resource pool can be configured to transmit the communication data of direct link.

To be noted that the various functional units in the above embodiments can be integrated in a single processing module, or the individual units can be physically configured separately, or two or more units can be integrated in one single module. The above integrated modules can be implemented either in the form of hardware or in the form of software functional modules.

The integrated module, when implemented as the software function module and not sold or used as a stand-alone product, may be stored in a computer readable storage medium. Based on the understanding, the technical solution of the present disclosure, or the part or all of the present disclosure that essentially contributes to the related art, may be embodied in the form of the software product that is stored in a storage medium. The storage medium includes a number of instructions to enable a computer device (which may be a personal computer, a server, or a network device, and so on) or a processor to perform all or some of the operations of the method of the present disclosure. The aforementioned storage medium includes a USB drive, a removable hard disk, a read only memory (ROM), a random access memory (RAM), a magnetic disk, an optical disk, or other media that can store program codes.

Figure 10:
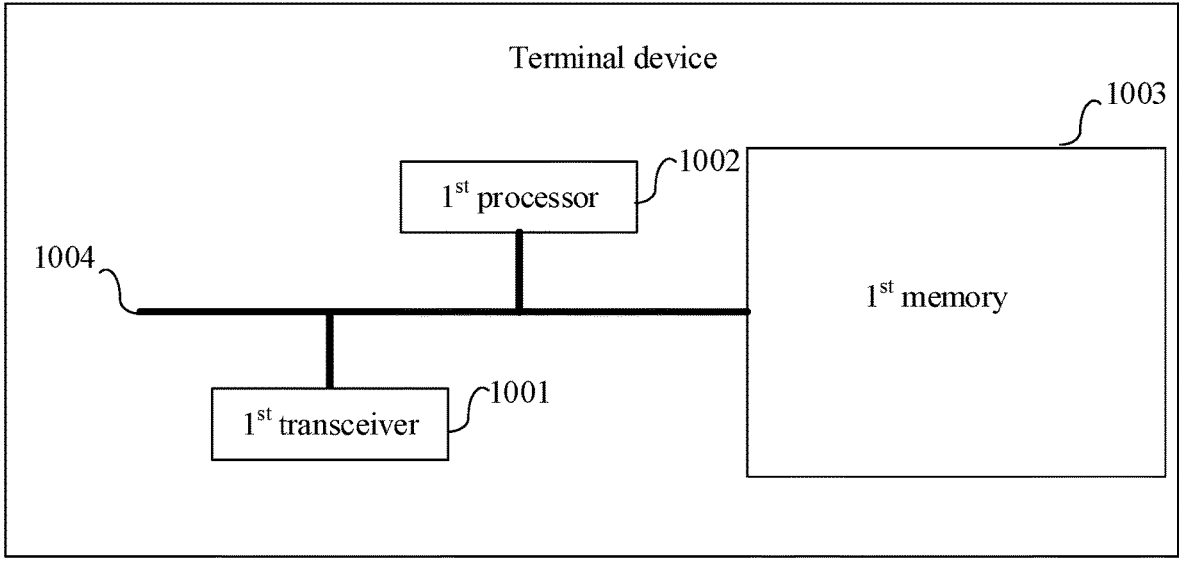
FIG. 10 is a schematic block diagram of a terminal device according to an embodiment of the present disclosure.

Based on the above embodiments, a terminal device is also provided by the present disclosure, as shown in FIG. 10. The terminal device in the present embodiment may include a first transceiver 1001, a first processor 1002, and a first memory 1002 in which a computer program is stored.

The first transceiver 1001, the first processor 1002, and the first memory 1003 communicate with each other via a first communication bus 1004.

The first processor 1002 is configured to communicate with the network device via the first transceiver 1001.

The first processor 1002 may invoke program instructions of the first memory 1003 to perform the following operations: determining the target resource pool from the multiple available resource pools. The multiple available resource pools are configured as resource pools capable of transmitting the discovery message.

The first processor 1002 further invokes the program instructions of the first memory 1003 to control the transceiver 1001 to perform: transmitting the discovery message based on the target resource pool.

In some embodiments, the multiple available resource pools include at least one data resource pool.

Correspondingly, the first processor 1002 further invokes the program instructions of the first memory 1003 to perform following operations.

The first processor 1002 determines, from the at least one data resource pool, the data resource pool that satisfies the first predetermined condition as the target resource pool.

The first predetermined condition is that the congestion parameter of any of the at least one data resource pool is less than the first congestion threshold; and the first congestion threshold is determined based on the priority level of the discovery message corresponding to any of the at least one data resource pool.

In some embodiments, the multiple available resource pools include at least one discovery resource pool. Correspondingly, the first processor 1002 further invokes the program instructions of the first memory 1003 to perform following operations.

The first processor 1002 determines, from the at least one discovery resource pool, the discovery resource pool that satisfies the second predetermined condition as the target resource pool.

The second predetermined condition is that a congestion parameter of any of the at least one discovery resource pool is less than a second congestion threshold. The second congestion threshold is determined based on a priority level of the discovery message corresponding to any discovery resource pool.

In some embodiments, the multiple available resource pools may include at least one discovery resource pool and at least one data resource pool.

The first processor 1002 further invokes the program instructions of the first memory 1003 to perform following operations.

The terminal device determines the target resource pool from the at least one discovery resource pool.

In some embodiments, the first processor 1002 invokes the program instructions of the first memory 1003 to perform operations of: determining, from the at least one discovery resource pool, a discovery resource pool that satisfies the second predetermined condition as the target resource pool.

In some embodiments, the first processor 1002 invokes the program instructions of the first memory 1003 to perform operations of: in response to none of the at least one discovery resource pool satisfying the second predetermined condition, determining the data resource pool that satisfies the first predetermined condition, from the at least one data resource pool, as the target resource pool.

In some embodiments, the multiple available resource pools may include the exceptional resource pool.

The first processor 1002 invokes the program instructions of the first memory 1003 to perform following operations.

The first processor 1002 determines the exceptional resource pool as target resource pool under any of the following conditions:

when the multiple available resource pools include at least one data resource pool, and when none of the at least one data resource pool satisfies the first predetermined condition;

when the multiple available resource pools include at least discovery resource pool, and when none of the at least one discovery resource pool satisfies the second predetermined condition; and when the multiple available resource pools include at least discovery resource pool and at least one data resource pool, none of the at least one data resource pool satisfies the first predetermined condition, and none of the at least one discovery resource pool satisfies the second predetermined condition.

In some embodiments, the number of data resource pools, which are included in the at least one data resource pool and satisfy the first predetermined condition, is more than one.

The first processor 1002 invokes the program instructions of the first memory 1003 to perform operations of: determining, from the more than one data resource pools that satisfy the first predetermined condition, one data resource pool as the target resource pool in at least one of the following manners.

The first processor 1002 determines, according to the implementation, one data resource pool from the more than one data resource pools that satisfy the first predetermined condition.

The first processor 1002 determines, based on the order of values of the congestion parameters corresponding to the more than one data resource pools that satisfy the first predetermined condition, one data resource pool from the more than one data resource pools that satisfy the first predetermined condition.

The first processor 1002 determines, based on the geographic location configuration information corresponding to each of the more than one data resource pools that satisfy the first predetermined condition, one data resource pool from the more than one data resource pools that satisfy the first predetermined condition.

In some embodiments, the number of discovery resource pools, which satisfy the second predetermined condition and are included in the at least one discovery resource pool, is more than one.

The first processor 1002 invokes the program instructions of the first memory 1003 to perform operations of: determining, from the more than one discovery resource pools that satisfy the second predetermined condition, one discovery resource pool as the target resource pool in at least one of the following manners.

The first processor 1002 determines, based on the implementation, one discovery resource pool from the more than one discovery resource pools that satisfy the second predetermined condition.

The first processor 1002 determines, based on the order of values of the second congestion parameters corresponding to the more than one discovery resource pools that satisfy the second predetermined condition, one discovery resource pool from the more than one discovery resource pools that satisfy the second predetermined condition.

The first processor 1002 determines, based on geographic location configuration information corresponding to each of the more than one discovery resource pools that satisfy the second predetermined condition, one discovery resource pool from the more than one discovery resource pools that satisfy the second predetermined condition.

In some embodiments, the first processor 1002 invokes the program instructions of the first memory 1003 to control the first transceiver 1001 to perform operations of: receiving the first indication information sent from the network device. The first indication information is configured to indicate that the data resource pool can be configured to transmit the discovery message of direct link.

In some embodiments, the first processor 1002 invokes the program instructions of the first memory 1003 to control the first transceiver 1001 to perform operations of: receiving the first configuration information sent from the network device. The first configuration information is used to configure the data resource pool. The first configuration information carries the first indication information.

In some embodiments, the first configuration information is carried via the system message or the dedicated signaling.

In some embodiments, the first configuration information carries the first indication message in at least one of the following ways.

The first configuration information includes the target field. When the value of the target field is the first value, it is indicated that the data resource pool can be configured to transmit the discovery message of direct link.

The first configuration information includes resource pool configuration information for the at least one data resource pool. When the number of resource pool configuration information is the predetermined number, it is indicated that the data resource pool can be used to transmit the discovery message of direct link.

The first configuration information includes first power configuration information. The first power configuration information is used to configure the power when the data resource pool is being used to transmit the discovery message. The first power configuration information is further configured to indicate that the data resource pool can be used to transmit the discovery message of direct link.

The first configuration information carries priority configuration information. The priority configuration information is used to configure priority information for the discovery message. The priority configuration information is further configured to indicate that the data resource pool can be used to transmit the discovery message of direct link.

In some embodiments, the first processor 1002 invokes the program instructions of the first memory 1003 to control the first transceiver 1001 to perform operations of: receiving second configuration information sent from the network device. The second configuration information is used to configure the discovery resource pool.

In some embodiments, the second configuration information is carried via the system message or the dedicated signaling.

In some embodiments, the second configuration information further includes second power configuration information. The second power configuration information is used to configure the power when the discovery resource pool is being used to transmit the discovery message.

In some embodiments, the second configuration information further includes period configuration information. The period configuration information is used to instruct the terminal device to transmit the discovery message at a predetermined period.

In some embodiments, the first processor 1002 invokes the program instructions of the first memory 1003 to control the first transceiver 1001 to perform operations of: receiving second indication information sent from the network device. The second indication information indicates that the discovery resource pool can be used to transmit the communication data of direct link.

Figure 11:
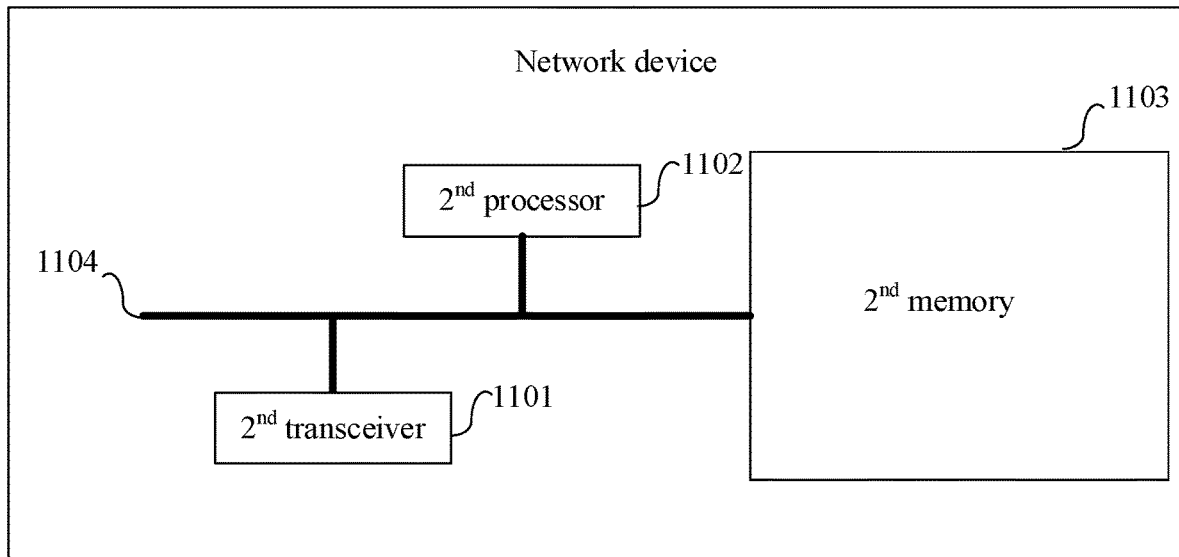
FIG. 11 is a schematic block diagram of a network device according to an embodiment of the present disclosure.

Based on the previous embodiment, a network device is also provided by the present disclosure, as shown in FIG. 11. The network device in the present embodiment may include a second transceiver 1101, a second processor 1102, and a second memory 1102 in which a computer program is stored.

The second transceiver 1101, the second processor 1102, and the second memory 1103 communicate with each other via a second communication bus 1104.

The second processor 1102 is configured to communicate with the terminal device via the second transceiver 1101.

The second processor 1102 may invoke program instructions in the second memory 1103 to control the second transceiver 1101 to perform the following operations.

The first indication information is transmitted to the terminal device. The first indication information is configured to indicate that the data resource pool can be configured to transmit the discovery message of direct link, and indicate that the data resource pool is a resource pool configured to transmit communication data of the direct link.

In some embodiments, the second processor 1102 may further invoke program instructions in the second memory 1103 to control the second transceiver 1101 to perform the operations of: transmitting the first configuration information to the terminal device. The first configuration information is used to configure the data resource pool and carries the first indication information.

In some embodiments, the first configuration information may be carried by the system information or the dedicated signaling.

In some embodiments, the first configuration information carries the first indication information in at least one of the following manners.

The first configuration information includes the target field. When the value of the target field is a first value, it is indicated that the data resource pool can be used to transmit the discovery message of direct link.

The first configuration information includes resource pool configuration information for at least one data resource pool. When the number of resource pool configuration information is a predetermined number, it is indicated that the data resource pool may be configured to transmit the discovery message of direct link.

The first configuration information includes first power configuration information. The first power configuration information is used to configure a power when the data resource pool is used to transmit the discovery message. The first power configuration information is further configured to indicate that the data resource pool can be used to transmit the discovery message of direct link.

The first configuration information carries priority configuration information. The priority configuration information is used to configure priority information of the discovery message. The priority configuration information is further configured to indicate that the data resource pool can be configured to transmit the discovery message of direct link.

In some embodiments, the second processor 1102 may further invoke program instructions in the second memory 1103 to control the second transceiver 1101 to perform the operations of: transmitting the second configuration information to the terminal device. The second configuration information is used to configure the discovery resource pool. The discovery resource pool is the resource pool used to transmit the discovery message of direct link.

In some embodiments, the first configuration information may be carried by the system information or the dedicated signaling.

In some embodiments, the second configuration information further includes second power configuration information. The second power configuration information is used to configure the power when the discovery resource pool is being used to transmit the discovery message.

In some embodiments, the second configuration information further includes period configuration information. The period configuration information is configured to instruct the terminal device to transmit the discovery message according to a preset period.

In some embodiments, the second processor 1102 may further invoke program instructions in the second memory 1103 to control the second transceiver 1101 to perform the operations of: transmitting second indication information to the terminal device. The second indication information indicates that the discovery resource pool can be configured to transmit the communication data of direct link.

In the embodiments of the present disclosure, each of the first processor and the second processor may be at least one of an application specific integrated circuit (ASIC), a digital signal processing device (DSPD), a programmable logic device (PLD), a field programable gate array (FPGA), a central processing unit (CPU), and a controller. It will be understood that, for different devices, the electronic elements used to implement the functions of the above processors may also be in other forms, which will not be limited herein.

In practice, each of the above-mentioned first memory and the second memory may be a volatile memory, such as a RAM; or a non-volatile memory, such as a ROM, a flash memory, a hard disk drive (HDD) or a solid-state drive (SSD); or a combination of the above-mentioned types of memories. Further, the memory may provide instructions and data to the processor.

Embodiments of the present application further provide a computer storage medium, which may specifically be a computer readable storage medium, and computer instructions are stored thereon. Any of the operations of the method of transmitting the discovery message in the present disclosure can be implemented when the computer instructions are executed by the processor and when the computer storage medium is located on a network device or a terminal device.

It should be understood that in the various embodiments of the present disclosure, the serial numbers of the operations described above does not imply a sequence of executing the operations. The order of executing the operations shall be determined by their function and intrinsic logic, and shall not be limited by the processes described in the embodiments of the present disclosure.

Any ordinary skilled person in the art shall be aware that the units and algorithmic operations of the various examples described in the embodiments herein are capable of being implemented in electronic hardware, or a combination of computer software and electronic hardware. Whether these functions are performed in hardware or software depends on specific applications and design constraints of a technical solution. The skilled person may use different methods to implement the described functions for each application, but such implementations shall not be considered being out of the scope of the present disclosure.

It will be clear to those ordinary skilled person in the art that, in order to provide convenient and brief description, the specific working processes of the systems, devices and units described above may be referred to the corresponding processes in the preceding method embodiments and will not be repeated here.

In the several embodiments provided in the present disclosure, it should be understood that the disclosed systems, devices and methods can be implemented in other ways. For example, the embodiments of the devices described above are merely schematic. For example, the described units are divided only based on logical functions, but can be divided in another way when being implemented in practice. For example, multiple units or components can be combined or can be integrated into another system, or some features can be omitted or not implemented. On another point, mutual coupling or direct coupling or communicative connection may be an indirect coupling or communicative connection through some interfaces, devices, or units, which may be electrical coupling or connection, mechanical coupling or connection, and so on.

The units illustrated as separate components may or may not be physically separated, and the components displayed as units may or may not be physical units. That is, they may be located in one place or may be distributed to multiple network units. Some or all of these units can be determined according to practical needs to achieve the purpose of the present disclosure.

In addition, the individual functional units in the various embodiments of the present disclosure may be integrated in one processing unit, or the individual units may be physically present separately, or two or more units may be integrated in one single unit.

The functions may be stored in a computer readable storage medium if the functions are implemented in the form of a software functional unit and sold or used as a separate product.

It is understood that the technical solution of the present disclosure, or the part of the present disclosure that essentially contributes to the related art, may be embodied in the form of a software product, stored in a storage medium that includes a number of instructions to enable a computer device (which may be a personal computer, a server, or a network device, and so on) to perform all or some of the operations of the method described in the various embodiments of the present disclosure. The above-mentioned storage medium includes a USB stick, a removable hard disk, a read-only memory (ROM), a random access memory (RAM), a magnetic disk, an optical disk, or various other media that can store program codes.

The above description is only a specific implementation of the present disclosure, but the scope of protection of the present disclosure is not limited thereto. Any variation or substitution derived by any ordinary skilled person in the art within the technical scope disclosed in the present disclosure shall be covered by the scope of the present disclosure. Accordingly, the scope of the present disclosure shall be governed by the scope of the stated claims.

What is claimed is:

1. A method of transmitting a discovery message in a side link communication, comprising:

determining, by a terminal device, a target resource pool from multiple available resource pools, wherein the multiple available resource pools are configured to transmit the discovery message; and transmitting, by the terminal device, the discovery message based on the target resource pool, wherein the multiple available resource pools comprise at least one of: at least one discovery resource pool, at least one data resource pool and an exceptional resource pool, wherein each of the at least one discovery resource pool is configured to transmit the discovery message; each of the at least one data resource pool is capable of transmitting the discovery message as being indicated by a network device; and the exceptional resource pool is a resource pool that is used by the terminal device when the terminal device is in an exceptional state;

determining, by the terminal device, the target resource pool from the multiple available resource pools, comprises:

in case that the terminal device is configured with both the at least one discovery resource pool and the least one data resource pool, firstly determining, by the terminal device, from the at least one discovery resource pool and the at least one data resource pool, a discovery resource pool as the target resource pool when the terminal device desires to initiate the side link communication, or when the terminal device desires to access the network device via another terminal device.

2. The method according to claim 1, before determining, by the terminal device, the target resource pool from the multiple available resource pools, further comprising:

receiving, by the terminal device, first indication information sent from the network device, wherein the first indication information is configured to indicate that the data resource pool is capable of transmitting the discovery message.

3. The method according to claim 2, wherein the first indication information is carried in first configuration information, and the first configuration information is carried via a system message or a dedicated signaling.

4. The method according to claim 1, further comprising:

receiving, by the terminal device, second configuration information sent from the network device, wherein the second configuration information is used to configure the discovery resource pool.

5. The method according to claim 4, wherein the second configuration information further comprises second power configuration information, and the second power configuration information is used to configure a power when the discovery resource pool is being used to transmit the discovery message.

6. The method according to claim 4, wherein the second configuration information is carried via a system message or a dedicated signaling.

7. The method according to claim 1, wherein the exceptional state comprises at least one of: switchover, wireless link failure, or resource pool updating.

8. A terminal device, comprising: a first transceiver, a first processor, and a first non-transitory memory storing a computer program;

wherein the first transceiver, the first processor, and the first non-transitory memory are communicated with each other via a first communication bus;

the first processor is configured to communicate with a network device via the first transceiver;

the first processor is further configured to operate, when running the computer program stored in the first non-transitory memory, cooperatively with the first transceiver to perform operations of:

determining a target resource pool from multiple available resource pools, wherein the multiple available resource pools are configured to transmit a discovery message; and controlling the first transceiver to transmit the discovery message based on the target resource pool, wherein the multiple available resource pools comprise at least one of: at least one discovery resource pool, at least one data resource pool and an exceptional resource pool, wherein each of the at least one discovery resource pool is configured to transmit the discovery message; each of the at least one data resource pool is capable of transmitting the discovery message as being indicated by the network device; and the exceptional resource pool is a resource pool that is used by the terminal device when the terminal device is in an exceptional state;

determining the target resource pool from the multiple available resource pools, comprises:

in case that the terminal device is configured with both the at least one discovery resource pool and the least one data resource pool, firstly determining, by the terminal device, from the at least one discovery resource pool and the at least one data resource pool, a discovery resource pool as the target resource pool when the terminal device desires to initiate a side link communication, or when the terminal device desires to access the network device via another terminal device.

9. The terminal device according to claim 8, wherein before determining the target resource pool from the multiple available resource pools, the first processor is further configured to perform operations of:

controlling the first transceiver to receive first indication information sent from the network device, wherein the first indication information is configured to indicate that the data resource pool is capable of transmitting the discovery message.

10. The terminal device according to claim 9, wherein the first processor is further configured to perform operations of:

controlling the first transceiver to receive first configuration information sent from the network device, wherein the first configuration information is used to configure the data resource pool, and the first configuration information carries the first indication information.

11. The terminal device according to claim 8, wherein the first processor is further configured to perform, when running the computer program stored in the first non-transitory memory, operations of:

controlling the first transceiver to receive second configuration information sent from the network device, wherein the second configuration information is used to configure the discovery resource pool.

12. The terminal device according to claim 11, wherein the second configuration information further comprises second power configuration information, and the second power configuration information is used to configure a power when the discovery resource pool is being used to transmit the discovery message.

13. The terminal device according to claim 11, wherein the second configuration information is carried via a system message or a dedicated signaling.

14. The terminal device according to claim 8, wherein the exceptional state comprises at least one of: switchover, wireless link failure, or resource pool updating.

15. A non-transitory computer-readable storage medium having stored thereon computer instructions that, when executed by a processor of a terminal device, cause the processor to perform operations comprise:

determining a target resource pool from multiple available resource pools, wherein the multiple available resource pools are configured to transmit a discovery message; and transmitting the discovery message based on the target resource pool, wherein the multiple available resource pools comprise at least one of: at least one discovery resource pool, at least one data resource pool and an exceptional resource pool, wherein each of the at least one discovery resource pool is configured to transmit the discovery message; each of the at least one data resource pool is capable of transmitting the discovery message as being indicated by a network device; and the exceptional resource pool is a resource pool that is used by the terminal device when the terminal device is in an exceptional state;

determining the target resource pool from the multiple available resource pools, comprises:

in case that the terminal device is configured with both the at least one discovery resource pool and the least one data resource pool, firstly determining, from the at least one discovery resource pool and the at least one data resource pool, a discovery resource pool as the target resource pool when the terminal device desires to initiate a side link communication, or when the terminal device desires to access the network device via another terminal device.

16. The non-transitory computer-readable storage medium according to claim 15, before determining the target resource pool from the multiple available resource pools, the operations further comprise:

receiving first indication information sent from the network device, wherein the first indication information is configured to indicate that the data resource pool is capable of transmitting the discovery message.

17. The non-transitory computer-readable storage medium according to claim 16, wherein the first indication information is carried in first configuration information, and the first configuration information is carried via a system message or a dedicated signaling.

18. The non-transitory computer-readable storage medium according to claim 15, wherein the operations further comprise:

receiving second configuration information sent from the network device, wherein the second configuration information is used to configure the discovery resource pool.

19. The non-transitory computer-readable storage medium according to claim 18, wherein the second configuration information further comprises second power configuration information, and the second power configuration information is used to configure a power when the discovery resource pool is being used to transmit the discovery message.

20. The non-transitory computer-readable storage medium according to claim 15, wherein the exceptional state comprises at least one of: switchover, wireless link failure, or resource pool updating.

* * * * *